(No Model.)
F. J. HUELSEN & J. NAGEL.
BICYCLE.
No. 452,073. Patented May 12, 1891.
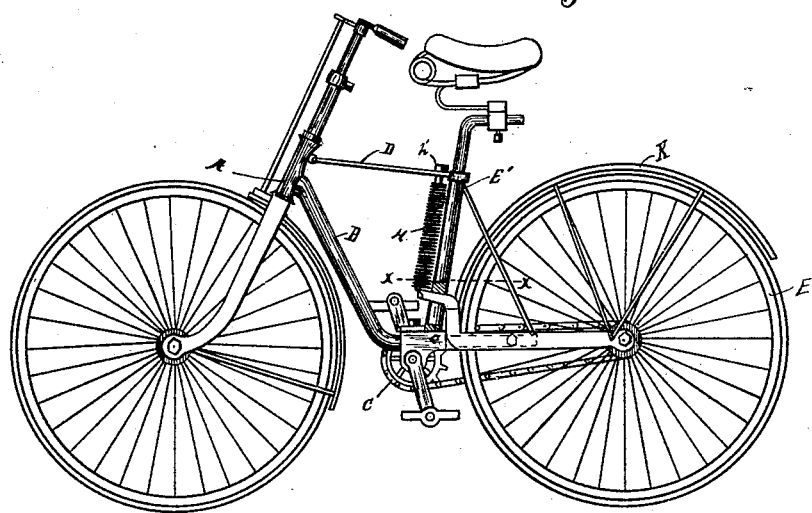
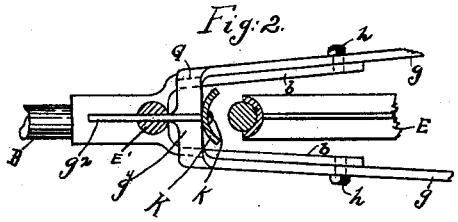
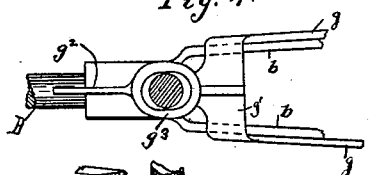
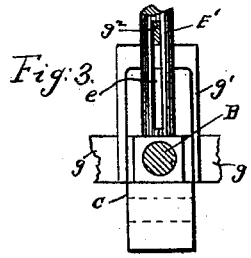
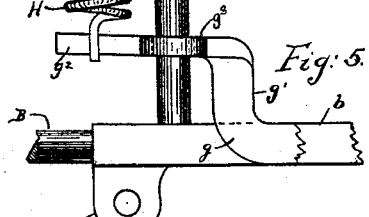
WITNESSES:
INVENTORS
ATTORNEY.

UNITED STATES PATENT OFFICE.

FELIX J. HUELSEN AND JACOB NAGEL, OF CLEVELAND, OHIO.

BICYCLE.

SPECIFICATION forming part of Letters Patent No. 452,073, dated May 12, 1891.

Application filed January 29, 1891. Serial No. 379,587. (No model.)

*To all whom it may concern:*

Be it known that we, FELIX J. HUELSEN and JACOB NAGEL, citizens of the United States, residing at Cleveland, in the county of Cuyahoga and State of Ohio, have invented certain new and useful Improvements in Bicycles; and we do hereby declare that the following is a full, clear, and exact description of the invention, which will enable others skilled in the art to which it appertains to make and use the same.

Our invention relates to bicycles; and the invention provides mechanism for relieving the seat of the rider from the jar and vibration which unavoidably occurs in the original machines, and which are both annoying and uncomfortable. We are aware that others have made inventions with a similar object in view, and that springs and pivotal connections in mechanism for this purpose are not broadly new; but we are not aware that the construction and arrangement of parts embodied in our invention and characterizing the same were ever before known or used.

In the accompanying drawings, Figure 1 is a side elevation of a bicycle containing our improvement. Fig. 2 is a plan view substantially on line $x\ x$, Fig. 1, showing how the arm of the bifurcated rear frame projects through the seat-standard, the said standard being broken away in Fig. 1 to show the said construction. Fig. 3 is substantially a front elevation of Fig. 2, showing the slotted portion of the seat-standard, and showing in that connection the head for the drive or pedal wheel spindle and a front view of the bifurcated rear frame. Fig. 4 is a plan view of another form of connection between the seat-standard and the bifurcated rear frame, in which the said frame has an oblong opening through which the standard passes instead of having a slot for the arm of the said frame to pass through; otherwise this view corresponds to the view in Fig. 2. Fig. 5 is a side elevation of Fig. 4, and represents the parts about in the relation seen in Fig. 1.

It will be seen that we have effected the result aimed at with the least possible change in the old machine compatible with our purpose. All the parts remain as originally, except in the slight particulars hereinafter specified. Thus the bifurcated steering-post A, the reach B down to and including the bearing for the pedal-wheel C, the connecting rod or bar D, and the seat-standard, except as shown in Figs. 1, 2, and 3, are the same as in the old machine.

The modification adapting the machine to our improvement begins with the extensions or bifurcations $b$ of the reach B, which formerly projected back to the rear wheel E and had bearings provided for said wheel. In this instance the extensions or arms $b$ are cut to about half the former length and stop about half-way between the bearing-head $c$ for the pedal-wheel and the axle or spindle of the rear wheel E. Then, in order to make such extensions to the rear wheel complete and to carry out our purpose, we introduce a supplemental yoke-frame G, having arms $g$ reaching to the rear wheel-spindle and supported thereon. At the front the frame G rises vertically at $g'$, and forward from its center projects an arm or tongue $g^2$, Figs. 1, 2, and 3, which passes through a close-fitting slot $e$ in standard E', and has a spring H connecting it with the cross-rod D.

The rear ends of extensions or arms $b$ of the reach are pivotally connected at $h$ with the arms $g$, and the two sets of arms lie side by side and in such relation and way that from a side view the inner arms $b$ are really not visible. If preferred, the spring H could be connected to a projection on the seat-standard and the rod D might be omitted. We show here, preferably, a spiral extensible spring, and a bolt $h'$ is shown as projecting into the same and is adapted to be turned to take up the tension.

In Figs. 4 and 5 we show a modification of the arm or tongue $g^2$, provided with an oblong opening or eye $g^3$, through which the seat-standard passes. In any case a close bearing on the sides is required between the said tongue and standard, and one at the same time which will permit free vertical or sliding movement of the tongue on the standard. Either or any similar construction might be adopted. It will be observed that this general construction introduces really only a single pivot connection, which is at $h$, and the yield under a load is in the spring H. Thus it occurs when the machine is passing over a rough road and otherwise a jarring trembling effect would be communicated to all the parts that the jar is dissipated or absorbed in the spring H and the movement of the machine is smooth to the rider.

It will be seen that the construction herein described is readily adaptable to machines now in use at slight expense. To do this it is only necessary to provide the frame G and spring H, cut off the arms $b$, and make the pivot, and in one way slot standard E. This is easily and quickly done and at comparatively small cost. If desired, a compression-spring beneath tongue $g^2$ might be substituted for the elongating spring shown. This and like departures from the construction illustrated may be made without departing from the spirit of the invention. The hind guard K is shown as secured by a screw $k$, Fig. 2, to the yoke $g^4$ of the supplemental frame G, and hence partakes of the movement of said frame. The standard E operates as a guide for the front end of frame G, and the side bearings of the tongue $g^2$ being very close they prevent lateral play of the parts and help to keep the parts in good vertical alignment.

Having thus described our invention, what we claim as new, and desire to secure by Letters Patent, is—

1. The reach provided with the short arms $b$ and the seat-standard and the pedal-shaft on said reach, in combination with the yoke-frame having the reach-arms pivoted thereon at or near its center and provided with a tongue extending in front of the seat-standard, and a spring connected with said tongue and supported from said standard, substantially as described.

2. The steering-post, the reach having diverging arms at its rear pivoted on the yoke-frame, the seat-standard on the reach, and a connecting-rod between the said standard and the steering-post, in combination with the yoke-frame supported on the rear wheel and having a tongue extending upward at its front end and bearing against the seat-standard, and a lifting-spring attached to said tongue and supported from said standard, substantially as described.

Witness our hands to the foregoing specification this 10th day of January, 1891.

FELIX J. HUELSEN.
   JACOB NAGEL.

Witnesses:
 N. L. McLane,
 H. T. Fisher.